July 27, 1965 M. M. KINTNER 3,196,511
FASTENING MEANS
Filed July 15, 1963 3 Sheets-Sheet 1
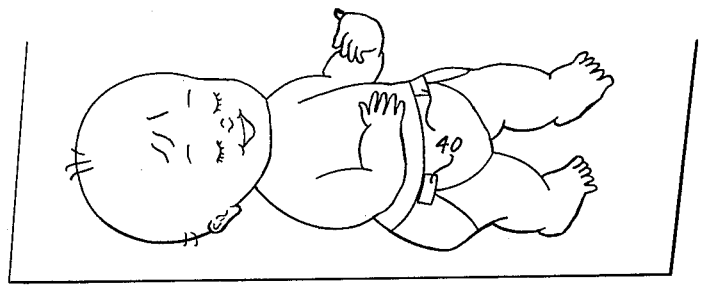
FIG. 10
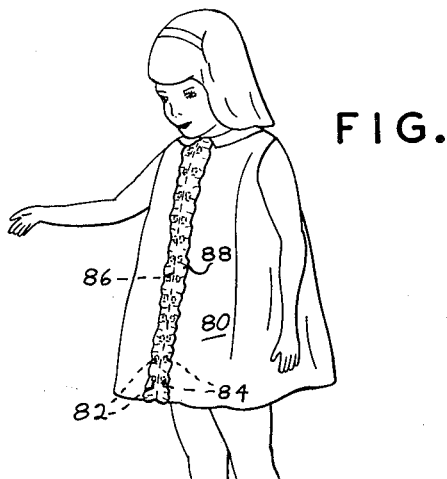
FIG. 12
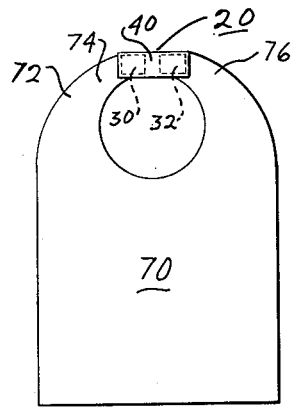
FIG. 11
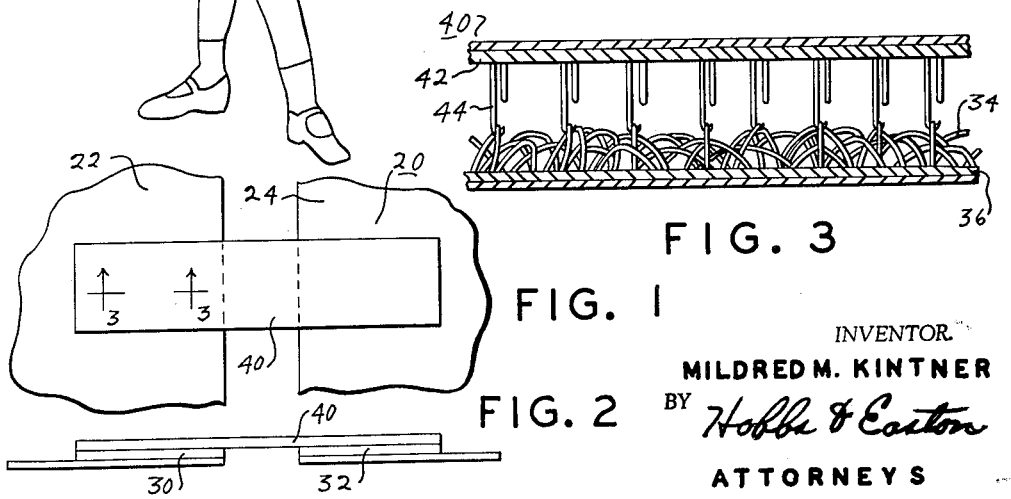
FIG. 3
FIG. 1
FIG. 2
INVENTOR.
MILDRED M. KINTNER
BY *Hobbs & Easton*
ATTORNEYS July 27, 1965     M. M. KINTNER     3,196,511
FASTENING MEANS Filed July 15, 1963     3 Sheets-Sheet 2

INVENTOR.
MILDRED M. KINTNER
BY *Hobbs & Easton*
ATTORNEYS

July 27, 1965  M. M. KINTNER  3,196,511
FASTENING MEANS

Filed July 15, 1963  3 Sheets-Sheet 3

INVENTOR.
MILDRED M. KINTNER
BY Hobbs & Easton
ATTORNEYS

United States Patent Office 3,196,511
Patented July 27, 1965

3,196,511
FASTENING MEANS
Mildred M. Kintner, 3624 Vistula Road, Mishawaka, Ind.
Filed July 15, 1963, Ser. No. 295,084
1 Claim. (Cl. 24—204)

The present invention relates to a fastening means and more particularly to a snap for securing two pieces of material or the like together.

The conventional means of securing two pieces of cloth or other material together, such as buttons, pins, hooks and eyes, and zippers, all have hard parts which interfere with laundering and ironing and become broken or damaged in those operations, and which occasionally scratch, prick or otherwise injure the wearer. In recent years a new type of securing means has been developed which eliminates most of the foregoing disadvantages, consisting of one part or element of numerous, closely spaced plastic hooks and another part of a felt-like material with numerous, closely spaced loops. When hook and loop elements are pressed into face-to-face contact, the hooks catch onto the loops and the two elements are retained firmly together until intentionally separated by pulling the two elements apart. One of the disadvantages of this type of fastener in laundering is that lint and other garments made of material having loop pile readily adhere to the plastic hook element, thus causing an inconvenience in separating the garments and cleaning the lint from the hook element. Further, the hook elements are relatively stiff, thick and bulky and often interfere with ironing, folding and storing, and, unless the ironing is carefully performed, these elements may be permanently damaged by the heat and pressure of the hot iron. It is therefore one of the principal objects of the present invention to provide a fastener for clothing and other articles made of cloth and the like which will launder as effectively as the cloth, and which will not interfere with the laundering or ironing operations or become damaged by these operations.

Another object of the invention is to provide a fastener utilizing the hook and loop-type elements which can be laundered without picking up lint or catching onto other garments, and which can be safely used in places and on garments where the conventional fasteners may cause injury to the wearer or damage the garment or may be too difficult to secure to be practical for use.

Still another object of the invention is to provide a fastening means for retaining two pieces of material, such as the parts of a garment together, which can be effectively and quickly adjusted to obtain the desired relationship between the two pieces each time the fastening means is secured, and which can be readily fastened without any special care being required to place the parts of the fastening means together.

Often the fastening means of a garment, in addition to functioning as a means for securing parts of the garment together, serves as an ornament or trimming which is of a color or configuration suited to the style of the garment, but completely unsuited for the occasion or wearer's complexion or other apparel worn at the same time. The conventional fasteners, normally being permanently attached to the garment, can not readily be changed to meet these changing situations. It is therefore another object of the present invention to provide a fastener or the like having ornamental characteristics which can be easily removed from the garment and replaced with any other suitable ornamental fastener of like construction.

A further object is to provide a fastening means of the aforesaid type which can be easily attached to material for securing two parts together in a variety of different shapes and with a number of different kinds of securing means, and which can be used effectively in conjunction with conventional fastening means or supports if it is desirable to do so.

Additional objects and advantages of the present invention will become apparent from the following description and accompanying drawings, wherein:

FIGURE 1 is a top plan or front elevational view of the present fastener illustrating the manner in which it secures two pieces of a fabric garment together;

FIGURE 2 is a side elevational view of the fastener shown in FIGURE 1;

FIGURE 3 is an enlarged cross sectional view of the fastener shown in FIGURES 1 and 2;

FIGURE 10 is a perspective view of a diaper showing the manner in which it is worn by a baby, as secured by the present fastener;

FIGURE 11 is a front elevational view of a bib on which the present fastener is used;

FIGURE 12 is a perspective view of a dress showing a further use of the present fastener, the dress being shown on a girl.

Figure 4:
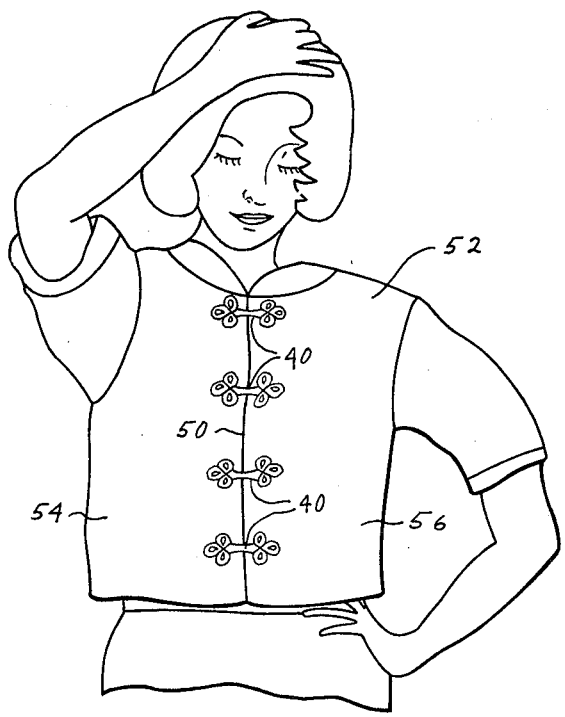
FIGURE 4 is a front elevational view of a jacket on which the present fastener is used, showing the jacket being worn by a woman.

Referring more specifically to the drawings and to FIGURES 1, 2 and 3 in particular, numeral 20 designates the present fastening means attached to the two sides of a jacket, for example having right and left sides 22 and 24 of fabric material such as cotton or wool cloth. The type of garment or parts to be secured to one another is not considered to be a part of the present invention, and the garments and wearing apparel illustrated and described in the drawings are primarily for the purpose of illustrating the present invention and the various uses thereof. However, in certain of the instances, the present fastener forms a special combination which constitutes a further aspect of the present invention, as will be more fully described hereinafter.

The present fastener consists of two elements 30 and 32 secured to fabric 22 and 24, respectively, by any suitable means such as sewing, heat sealing or adhesive material. The means used in securing the two elements 30 and 32 to the fabric should be of such a nature that the flexibility of the fabric and the two elements is not impaired. The two elements secured to the fabric consist of numerous loops 34 of material, the loops of material secured to a fabric backing 36, the surface of the elements closely resembling conventional felt. The loops as indicated by numeral 34 are in the form of flexible strands and closely and uniformly spaced throughout the fabric backing 36 and are sufficiently strong and firmly secured to the backing to prevent severing or dislodging as the fastening means is used continuously for long periods of time. The loop material may be of any desired color, depending upon the intended use and the fabric on which it is mounted.

The two elements 30 and 32 are interconnected by element 40 consisting of a plastic or fabric material 42 having on the underside thereof numerous hook-like members 44 extending downwardly from the underside of the fabric. These hooks are of sufficiently rigid or firm plastic that they will hold their shape, but have sufficient flexibility to permit the hooks to spring outwardly to disengage them from the loops 34 of elements 30 and 32. The entire underside of element 40 may be covered with hooks 44 closely spaced from one another or, in the embodiment illustrated in FIGURE 2, may consist of two independent parts with a space near the center of the element free of the hook elements. When the hooks 44 of element 40 are pressed onto and into the looped members of elements 30 and 32, the hooks engage and hook the loops, thus holding elements 30 and 32 firmly together. The exact position of element 40 with respect to elements 30 and 32 is not critical; however, primarily for the purpose of satisfactory appearance, a definite predetermined position, such as that illustrated in FIGURE 1, is desirable.

One of the primary advantages of the present invention is that the garment on which the present fastener is used can be easily and effectively laundered without the interference of the relatively stiff plastic element 40 in that this element is completely removed from the fastener when the garment is to be laundered, leaving only the felt-like elements 30 and 32 thereon. The two felt-like elements are sufficiently similar to the cloth of the garment that no special laundering care or caution is required to properly clean the garment and the felt-like elements are not distorted, torn or otherwise damaged by any normal laundering or cleaning operation. These two elements may also be ironed or passed through a mangle along with the remainder of the garment without causing any change to their basic structure or harm in their ability to function properly with element 40. Element 40 being normally of plastic can be readily cleaned by any suitable means, such as the separate washing thereof when removed from the garment.

Figure 5:
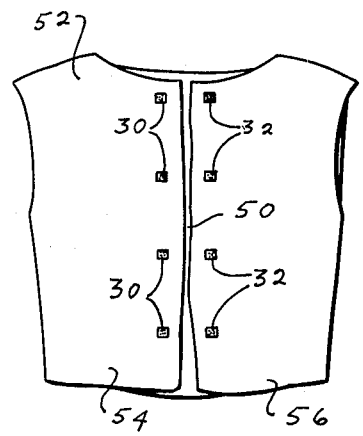
FIGURE 5 is a front elevational view of the jacket shown in FIGURE 4 with a portion of the fastener removed therefrom.
Figure 6:
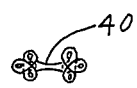
FIGURE 6 is a front elevational view of a portion of the fastener shown in FIGURE 4 removed from the jacket, as illustrated in FIGURE 5.
Figure 7:
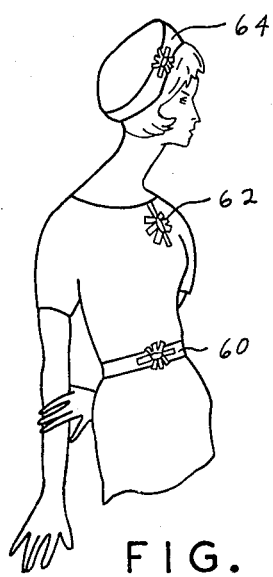
FIGURE 7 is an illustration of a further use of the present fastener on a band for a hat, on a dress and on a belt.
Figure 9:
FIGURE 9 is a front elevational view of a portion of the fastener removed from the belt shown in FIGURES 7 and 8.
Figure 8:
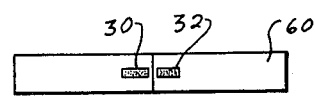
FIGURE 8 is a front elevational view of the belt shown in FIGURE 7, with a portion of the fastener removed therefrom.

FIGURES 4 and 5 illustrate one use of the present fastener, which consists of elements 30 and 32 placed along the opening 50 in the front of garment 52 in approximately the same position as the conventional buttons. The two elements are secured firmly to the fabric of jacket 52 and, after the wearer has put on the jacket, element 40 of the construction illustrated in FIGURES 1, 2 and 3, but of a special ornamental configuration, is placed across opening 50, engaging elements 30 and 32 at their opposite ends. When element 40 is pressed firmly onto elements 30 and 32, it adheres firmly thereto and remains securely in place and holds the sides 54 and 56 of the garment in place. When the jacket is to be removed, element 40 may be fully removed or the respective ends of each of the elements 40 removed from the respective element 30 or 32, thus permitting the two sides 54 and 56 to part. Further uses of the present fastener are shown in FIGURES 7, 8 and 9, which illustrate a belt 60, a broach-like fastener 62 and a band 64. Each of these three arrangements consists of elements 30 and 32 of felt secured to the belt, dress or band, and an element 40 of ornamental configuration connecting the two elements 30 and 32 in the manner previously described. This band and dress can be adjusted within limits to the desired arrangement is particularly useful in that the belt, hat size by merely overlapping element 40 a greater or lesser amount over elements 30 and 32. Further, the ornamental element 40 may be changed from time to time to vary the ensemble being worn at the time. The fastener indicated by numeral 62 may have the appearance of a broach as well as being used to close a neck placket, and various similar ornamental features can be used at other places on the dress or hat purely for their ornamental value.

FIGURE 10 illustrates the use of the present fastener on a diaper where it is of particular importance in that it eliminates the use of pins with their inherent danger to the baby, and at the same time permits easy and effective laundering without any interference from the plastic element 42. The two felt-like elements 30 and 32 are permanently secured to the diaper and, after the diaper has been arranged in proper place on the baby, element 40 is attached to the two felt-like elements. The fastening means can be adjusted either to loosen or tighten the diaper. When the diaper is to be laundered, element 40 is removed from the diaper and the diaper with the felt-like members 30 and 32 is laundered. The elements 30 and 32 would normally be placed at the four corners of a folded diaper on the same sides thereof, or would be in the form of strips extending along each end from the corners.

A bib 70 is illustrated in FIGURE 11 with the present fastening means 20 used to connect the ends of collar 72 at the back of the neck. The two collar members 74 and 76 are provided with the felt-like elements 30 and 32 at their ends and element 40 of the fastening means is applied to the elements 30 and 32 in the manner previously described to secure the two parts of collar members 74 and 76 together and thereby retain the bib 70 in place. The present fastening means is particularly usable with the bib as well as with the diaper as a means of effectively securing the articles in place on the baby without any danger of injuring the baby, either at the time the article is being assembled on the baby or any time thereafter as the baby moves, tugs and pulls at the article. The bib, likewise, can be readily laundered by merely completely removing element 40, thus leaving only the two felt-like elements 30 and 32 thereon which do not interfere with normal laundering of cloth material.

FIGURE 12 illustrates a further use of the present fastening means, used as a fastening means on a dress 80, the fastening means consisting of felt-like elements 82 and 84 on opposite sides of opening 86 and plastic hooked element 88 in the form of a ruffle extending the full length of the dress, or a substantial part thereof. One of the advantages of this particular type of fastening means is the fact that the member 88 can be removed for laundering and, since it may often contain ruffles, can be carefully handled in the cleaning and ironing operations apart from the normal cleaning of the dress, whereas the dress 80 can be opened flat for ease in ironing. The inner side of strip element 88 is fully covered with numerous plastic hooks 44, as illustrated in FIGURE 3. Various types of strip elements 88 may be used for the particular dress as shown, or they may be interchangeable with other dresses to give the ornamental effect desired.

Figure 13:
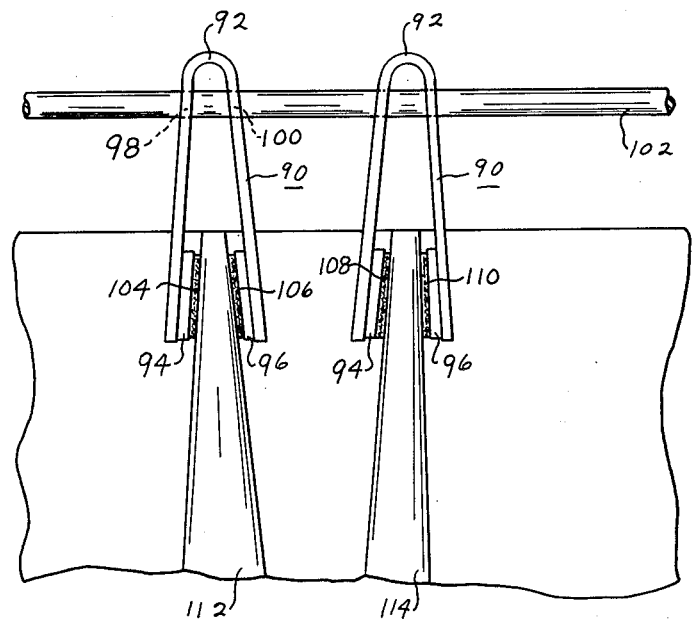
FIGURES 13, 14 and 15 are elevational views of a drapery or curtain support or fixture.
Figure 14:
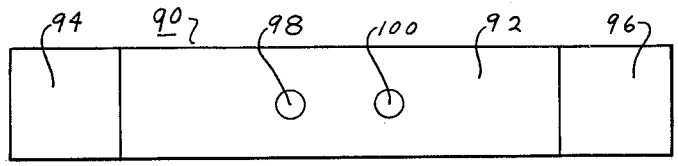
Figure 15:
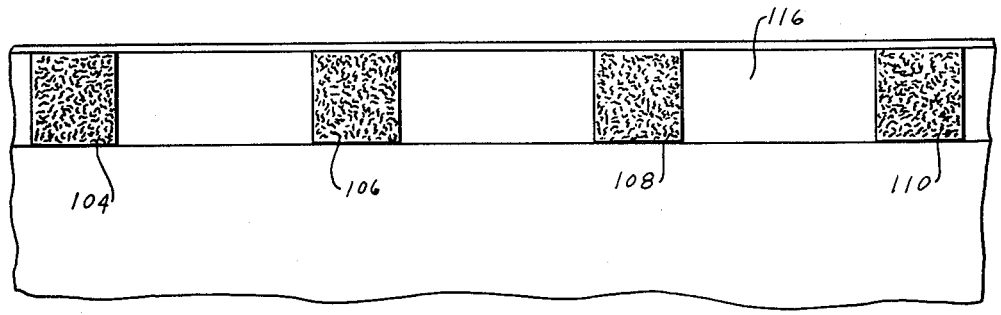

FIGURES 13, 14 and 15 illustrate a support or fixture 90 for draperies and curtains, consisting of a band-like member 92 having hooked elements 94 and 96 on the ends thereof and two spaced holes 98 and 100 near the center thereof. The band is folded into a U-shaped configuration and slipped onto a support rod 102 with the rod through the two holes and the ends having elements 94 and 96 extending downwardly from the rod. The curtain or drape is provided with intermittent felt pads 104, 106, 108 and 110 so spaced from one another that when the curtain or drape is pleated, the felt elements 104 and 106, for example, will be positioned on opposite sides of the pleats, as illustrated at numerals 112 and 114. The curtain or drape is hung in the pleated condition as illustrated in FIGURE 13 and the two plastic elements 94 and 96 of each fixture 90 are pressed onto the felt element, thereby supporting the drape or curtain and holding the pleats 112 and 114 in their pleated condition. If desired, the individual felt elements may be separately secured to the upper edge of the drape or curtain or they may be secured to a continuous strip of material 116, the strip of material being secured by sewing or by any other suitable securing means to the upper edge of the drape or curtain. The felt may be continuous, if desired, thus permitting the pleats to be placed in any position along the curtain; however, only spaced portions of the continuous strips are used in the hanging operation.

Other uses of the present fastening means are possible, for example securing ornamental fixtures on shoes with the fastener being used in the place of strings, straps or buttons, the primary feature in all of these applications being in the use of the felt-like elements 30 and 32 attached to the garment or article in combination with the completely removable plastic hook element.

While several modifications have been mentioned herein, various other modifications and changes may be made without departing from the scope of the invention.

I claim:

A fastening means in combination with wearing apparel having two spaced pieces of fabric material with internal and external surfaces: said fastening means comprising a pad-like element of relatively soft felt-like material on the external surface of each piece of fabric material, said pad-like elements being positioned adjacent each other and having numerous closely spaced resilient loops over substantially the entire surface of each element, and a removable elongated element having a strip of cloth-like material with inner and outer sides, said inner side of said strip having numerous closely spaced resilient hook-like members over substantially the entire inner side of the cloth-like material for engaging the loops of each of said pad-like elements, the interengagement of the hook-like members with the loops of the pad-like elements holding said elongated element to said pad-like elements and thereby retaining said pieces in closely spaced relation, and an ornamental means on the outer side of said strip.

References Cited by the Examiner

UNITED STATES PATENTS

| | | | |
|---|---|---|---|
| Re. 19,238 | 7/34 | Burke. | |
| 391,726 | 10/88 | Vorhis | 24—203 |
| 1,008,681 | 11/11 | Teuton | 24—203 |
| 1,222,678 | 4/17 | Savage. | |
| 1,921,999 | 8/33 | Dickinson | 128—171 |
| 2,439,339 | 4/48 | Grisanti | 2—237 |
| 2,592,148 | 4/52 | Isaacs | 2—237 |
| 2,602,929 | 7/52 | Chasinov | 24—206 |
| 2,717,437 | 9/55 | Demestral. | |
| 2,824,351 | 2/58 | Webb | 24—203 |
| 2,870,508 | 1/59 | Zubris | 36—50 |
| 2,976,914 | 3/61 | Miller. | |
| 3,015,896 | 1/62 | Breslow | 36—58.6 |
| 3,057,354 | 10/62 | Roberts. | |
| 3,081,772 | 3/63 | Brooks. | |
| 3,093,830 | 6/63 | Wills | 2—49 |
| 3,094,330 | 6/63 | Smith. | |
| 3,105,971 | 10/63 | Banks | 2—244 |

DONLEY J. STOCKING, *Primary Examiner.*

BERNARD A. GELAK, *Examiner.*